(12) United States Patent
Kim

(10) Patent No.: US 8,917,516 B2
(45) Date of Patent: Dec. 23, 2014

(54) FLEXIBLE DISPLAY DEVICE AND METHOD OF MANUFACTURING THE SAME

(75) Inventor: Min-Cheol Kim, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 125 days.

(21) Appl. No.: 13/443,304

(22) Filed: Apr. 10, 2012

(65) Prior Publication Data

US 2013/0194761 A1 Aug. 1, 2013

(30) Foreign Application Priority Data

Feb. 1, 2012 (KR) .......................... 10-2012-0010380

(51) Int. Cl.
*H05K 1/00* (2006.01)

(52) U.S. Cl.
USPC . 361/749; 361/752; 361/679.02; 361/679.01; 361/679.16; 361/679.21

(58) Field of Classification Search
CPC ..... G06F 3/041; G06F 1/1613; G06F 1/1626; G06F 1/637
USPC ....................... 349/158, 84; 345/55, 173, 176; 361/749, 752, 679.02, 679.09, 679.01, 361/679.16, 679.21, 679.26, 679.3
See application file for complete search history.

(56) References Cited

U.S. PATENT DOCUMENTS

| | | | | |
|---|---|---|---|---|
| 8,583,187 | B2* | 11/2013 | Kim et al. | ...... 455/566 |
| 2008/0204367 | A1* | 8/2008 | Lafarre et al. | ............ 345/55 |
| 2011/0210937 | A1 | 9/2011 | Kee et al. | |

FOREIGN PATENT DOCUMENTS

| KR | 10-2007-0120950 | 12/2007 |
|---|---|---|
| KR | 10-2010-0070730 | 6/2010 |
| KR | 10-2011-0098349 | 9/2011 |

* cited by examiner

*Primary Examiner* — Robert J Hoffberg
*Assistant Examiner* — Hung Dang
(74) *Attorney, Agent, or Firm* — Robert E. Bushnell, Esq.

(57) ABSTRACT

In a flexible display device including flexibility and toughness, and a method of manufacturing the flexible display device, the flexible display device includes a glass substrate, a flexible substrate and a display unit which are sequentially stacked, and the flexible display device has a structure wherein a surface area of the flexible substrate is larger than a surface area of the glass substrate. A volume of the device may be significantly reduced for convenience of portability since a flexible area where the glass substrate is not located may be folded or rolled. Also, a stable circuit connection may be guaranteed since the driving chip is installed on a hard area which does not go through a heating process in order to separate the glass substrate and the flexible substrate during the manufacturing process.

11 Claims, 5 Drawing Sheets

FLEXIBLE DISPLAY DEVICE AND METHOD OF MANUFACTURING THE SAME

CLAIM OF PRIORITY

This application makes reference to, incorporates the same herein, and claims all benefits accruing under 35 U.S.C.§119 from an application earlier filed in the Korean Intellectual Property Office on the 1$^{st}$ day of Feb. 2012 and there duly assigned Serial No. 10-2012-0010380.

BACKGROUND OF THE INVENTION

1. Field of the Invention

The present invention relates to a flexible display device and a method of manufacturing the same, and more particularly, to a flexible display device including flexibility and toughness, and a method of manufacturing the flexible and tough display device.

2. Description of the Related Art

Generally, a display device such as an organic light-emitting display device has a structure including a display unit on a hard glass substrate. However, a flexible bending property, which is required in recent display devices, may not be satisfied with such a structure. That is, although flexible display devices have recently been required to have high flexibility in order to be installed while being bent, such requirements may not be satisfied if a glass substrate of a hard material is used.

Accordingly, a structure using a flexible substrate formed of polyimide, instead of a substrate formed of a glass material, has been suggested in order to solve this problem. In this structure, the flexible substrate is formed on a glass substrate, a display unit is formed thereon, and the glass substrate is later separated to improve a final product in which the flexible substrate serves as a substrate.

However, when the glass substrate is removed, it is highly possible to partially damage the flexible substrate due to static electricity or heat. Then, portions on the substrate where modules such as a driving chip are to be installed may be damaged, and thus circuit connections may not be properly connected. Therefore, there is a demand for a method to solve this problem.

SUMMARY OF THE INVENTION

The present invention provides a flexible display device which is improved by including flexibility and toughness to reduce damage on a flexible substrate during the manufacturing process, and to maintain portability convenience, and a method of manufacturing the flexible display device.

According to an aspect of the present invention, there is provided a flexible display device which may include a glass substrate, a flexible substrate disposed on the glass substrate, and a display unit prepared on the flexible substrate, wherein a surface area of the flexible substrate may be larger than a surface area of the glass substrate.

An area of flexible substrate where the glass substrate is not located may be deformed within a range allowed by flexibility.

A driving chip is installed on a side of the flexible substrate where the glass substrate may be located.

A silicone stiffener for attaching the glass substrate and the flexible substrate may be applied around a border line between the area where the glass substrate is located and the area where the glass substrate is not located.

A corner of a cutting plane on a side of the border line of the glass substrate may be chamfered.

According to another aspect of the present invention, there is provided a method of manufacturing a flexible display device which may include sequentially stacking a glass substrate, a flexible substrate and a display unit; and making a surface area of the flexible substrate larger than a surface area of the glass substrate by cutting a portion of the surface area of the glass substrate.

The method may further include notching the glass substrate to a certain thickness before cutting off the portion of the surface area of the glass substrate.

The method may further include chamfering a corner of a cutting plane after cutting the portion of the surface area of the glass substrate.

The method further comprises attaching the flexible substrate to the glass substrate by applying a silicone stiffener around the cutting plane after cutting the portion of the surface area of the glass substrate.

The method may further include installing a driving chip on a side of the flexible substrate where the glass substrate remains.

The method may further include deforming the flexible substrate in an area where the glass substrate is not located within a range allowed by flexibility.

According to the flexible display device and the method of manufacturing the same, occurrence of faults due to damage on a substrate during the manufacturing process may be reduced while flexibility of the device is maintained. Thus, a product including both toughness and flexibility is manufactured.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

The present invention will now be described more fully with reference to the accompanying drawings, in which exemplary embodiments of the invention are shown.

Figure 1:
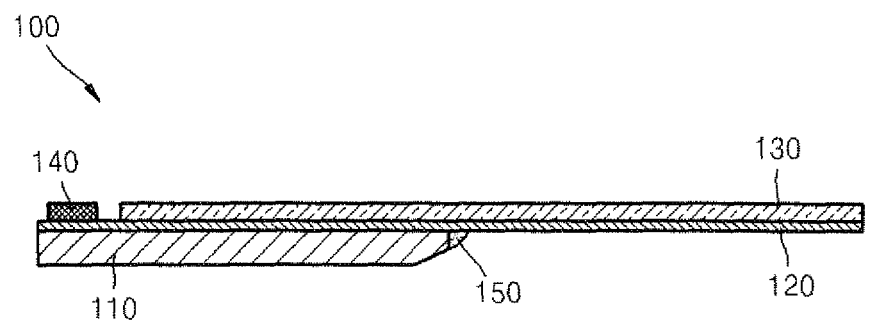
FIG. 1 is an illustration of a flexible display device according to an embodiment of the present invention.
Figure 2A:
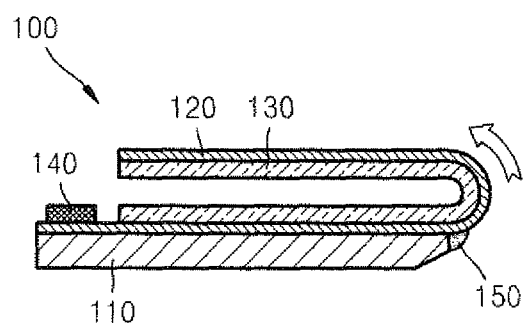
FIGS. 2A through 2C are drawings showing that the flexible display device illustrated in FIG. 1 may be deformed within a range allowed by flexibility.
Figure 2B:
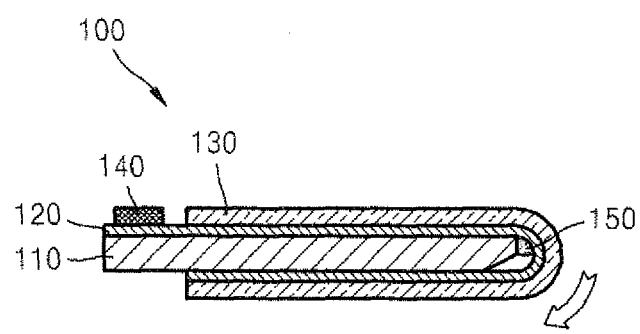
Figure 2C:
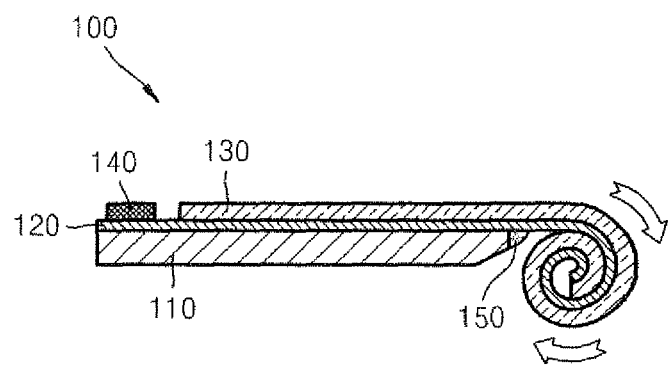

FIG. 1 is an illustration of a flexible display device according to an embodiment of the present invention; and FIGS. 2A through 2C are drawings showing that the flexible display device illustrated in FIG. 1 may be deformed within a range allowed by flexibility.

As shown in FIG. 1, the flexible display device 100 includes a glass substrate 110 of a hard glass material, a flexible substrate 120 formed of a flexible plastic material such as polyimide, and a display unit 130 where an image is displayed, the latter elements being sequentially stacked.

The display unit 130 includes a thin film transistor, a light-emitting device, and an encapsulation layer. All of these elements are shown simply as the display unit 130.

Also, the glass substrate 110 is not over an entire surface of the flexible display device 100. In fact, it is over only about one-half of the surface area of the flexible display device 100. That is, a substrate over the entire surface of the flexible display device 100 is the flexible substrate 120, and the glass substrate 110 is only over about one-half of the surface area of the flexible display device 100. Therefore, half of the surface area of the flexible display device 100, where the glass substrate 110 is not disposed, is capable of deformation, such as folding (FIG. 2A, FIG. 2B) or rolling (FIG. 3C), due to characteristics of the flexible substrate 120. However, the other half of the surface area of the flexible display device 100, where the hard glass substrate 110 is disposed, is not capable of such a deformation. Instead, since the area where the glass substrate 110 is located does not go through a process of separating from the flexible substrate 120 during the manufacturing process, the flexible substrate 120 is not damaged due to static electricity or heat. Thus, when a driving chip 140 is installed in the surface area, product defects may be reduced as a stable circuit connection is guaranteed. That is, a product which includes both flexibility, which may reduce volume by freely deforming the flexible display device 100 as shown in FIGS. 2A through 2C, and toughness, which may guarantee a stable installation of the driving chip 140 is manufactured.

Reference numeral 150 (in FIGS. 1 and 2A through 2C) refers to a silicone stiffener which attaches the glass substrate 110 and the flexible substrate 120 by being applied along a border line between the area where the glass substrate 110 is located and the area where the glass substrate 110 is not located. The silicone stiffener 150 serves to prevent unexpected separation of the flexible substrate 120 and the glass substrate 110.

FIGS. 3A through 3D are drawings showing processes of manufacturing the flexible display device illustrated in FIG. 1.

The flexible display device 100 of FIG. 1 with the structure described above, may be manufactured by the following processes.

Figure 3A:
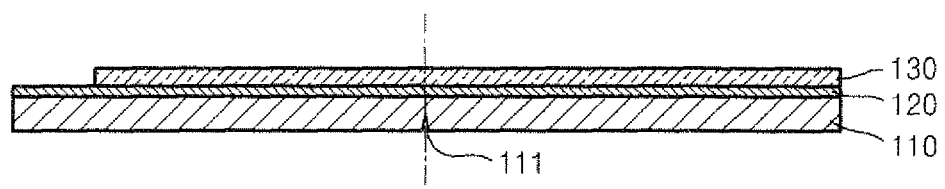
FIGS. 3A through 3D are drawings showing processes of manufacturing the flexible display device illustrated in FIG. 1.

First, as shown in FIG. 3A, the glass substrate 110, the flexible substrate 120, and the display unit 130 are sequentially stacked. Then, a notch 111 to indicate where to cut later is formed in the glass substrate 110 at a depth of about one-half of the thickness of the glass substrate 110. If the notch 111 is formed beforehand, a later cutting process is much easier to perform.

Figure 3B:
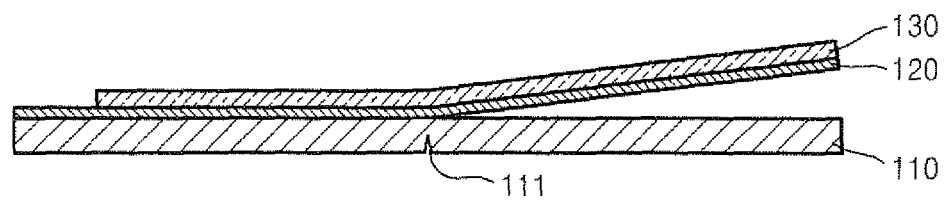

Subsequently, as shown in FIG. 3B, the flexible substrate 120 and the glass substrate 110 are separated about the area where the glass substrate 110 is to be removed. The separation may occur by irradiation of a laser light onto a corresponding area so as to generate the separation due to different thermal expansive coefficients of the substrates 110 and 120 as a result of radiating the laser beam onto the corresponding area.

Figure 3C:
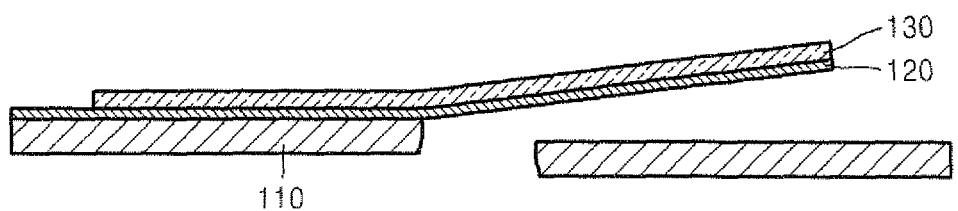

Next, as shown in FIG. 3C, the rest of the area of the notch 111 is cut, and about one-half of the glass substrate 110 is cut off. Then, a structure including the toughness of one-half the glass substrate 110 and the flexibility of the other half the flexible substrate 120 is manufactured.

Figure 3D:
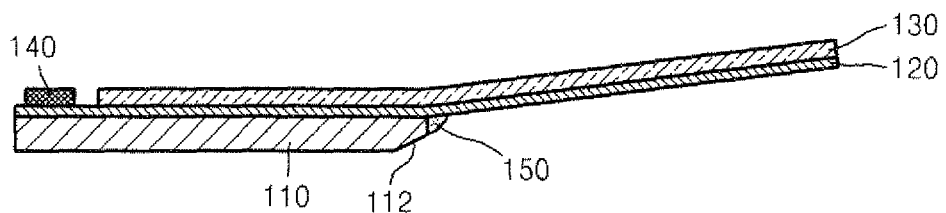

Lastly, as shown in FIG. 3D, a corner 112 on a cutting plane side is obtained by chamfering, the silicone stiffener 150 is applied along a border where the cutting plane is located, and the flexible substrate 120 is attached so as not to be separated unexpectedly. Later, when the driving chip 140 is installed on a region where the glass substrate 110 remains, the flexible display device 100 that has flexibility and toughness as described above is manufactured.

That is, since the flexible display device 100 may be folded or rolled as shown in FIGS. 2A through 2C, the volume may be significantly reduced for portability convenience. Also, a stable circuit connection may be guaranteed since the driving chip 140 is installed on an area which does not go through a heating process in order to separate the glass substrate 110 and the flexible substrate 120 during the manufacturing process.

Figure 4:
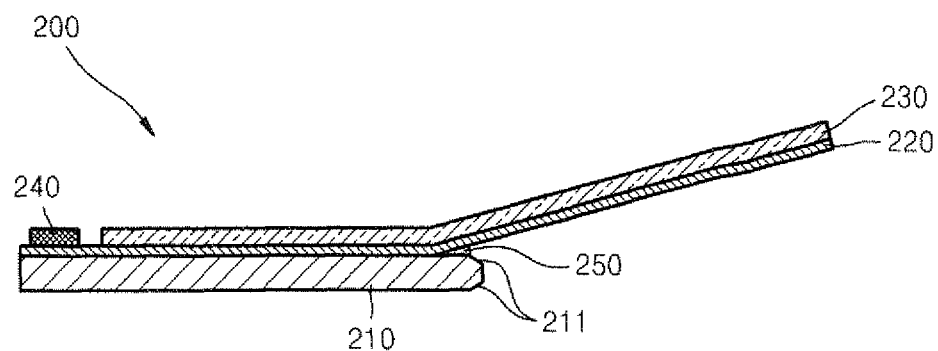
FIG. 4 is a drawing illustrating a flexible display device according to another embodiment of the present invention.

FIG. 4 is a drawing illustrating a flexible display device according to another embodiment of the present invention.

As shown in FIG. 4, the flexible display device 200 according to another embodiment of the present invention also includes a glass substrate 210 of a hard glass material, a flexible substrate 220 formed of a flexible plastic material such as polyimide, and a display unit 230 where an image is displayed, the latter elements being sequentially stacked.

Moreover, the glass substrate 210 also does not cover the entire surface of the flexible display device, but only covers about one-half of the surface of the flexible display device 200. Therefore, a half area, where the glass substrate 110 is not disposed, is capable of deformation, such as folding or rolling, due to characteristics of the flexible substrate 220. However, the other half area where the hard glass substrate 210 is disposed is not capable of such a deformation. Instead, since the area where the glass substrate 210 is located does not go through a process of separating from the flexible substrate 220 during the manufacturing process, the flexible substrate 220 is not damaged due to static electricity or heat. Thus, when a driving chip 240 is installed in the surface area where the hard glass substrate 210 is included, product defects may be reduced as a stable circuit connection is guaranteed.

Reference numeral 250 in FIG. 4 refers to a silicone stiffener which attaches the glass substrate 210 and the flexible substrate 220 by being applied along a border between the area where the glass substrate 210 is located and the area where the glass substrate 210 is not located.

FIGS. 5A through 5D are drawings showing processes of manufacturing the flexible display device illustrated in FIG. 4.

The flexible display device 200 of FIG. 4, with the structure described above, may be manufactured by the following processes.

Figure 5A:
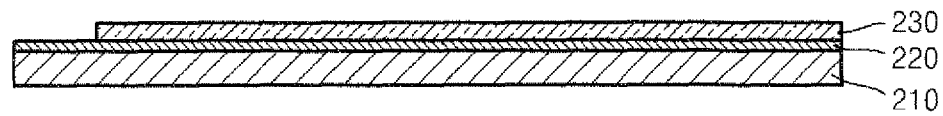
FIGS. 5A through 5D are drawings showing processes of manufacturing the flexible display device illustrated in FIG. 4.

First, as shown in FIG. 5A, the glass substrate 210, the flexible substrate 220, and the display unit 230 are sequentially stacked.

Figure 5B:
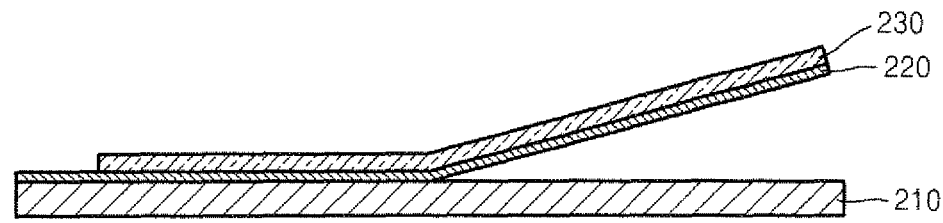

Then, a notch 111 (as seen in FIG. 3A above) could be formed on the glass substrate 210 according to an embodiment of the present invention described above. However, according to another embodiment of the present invention, the notching process can be skipped in order to perform a substrate separating process. That is, as shown in FIG. 5B, the flexible substrate 220 and the glass substrate 210 are separated from each other in the area where the glass substrate 210 is to be removed.

Figure 5C:
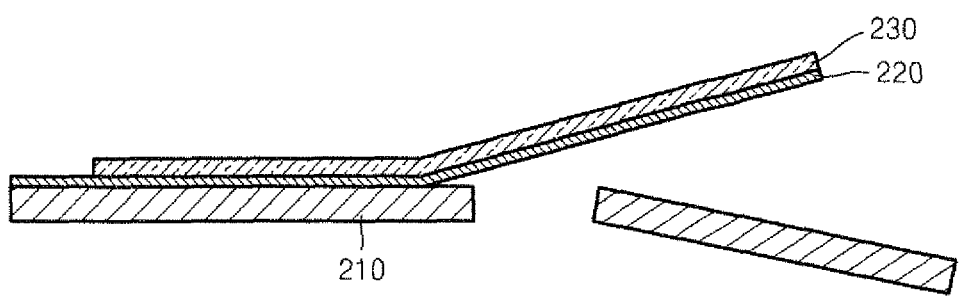

Next, as shown in FIG. 5C, a fixed portion of the glass substrate 210 is cut so as to remove another portion of the glass substrate 210. Thus, a structure having toughness of one side of the flexible substrate 220 and flexibility of the other side of the flexible substrate 220 is manufactured. According to the current embodiment, since the glass substrate 210 is cut without a notch, accurate cutting may be difficult. Therefore, an area a little wider than the border unit, where the flexible substrate 220 is separated, is cut.

Figure 5D:
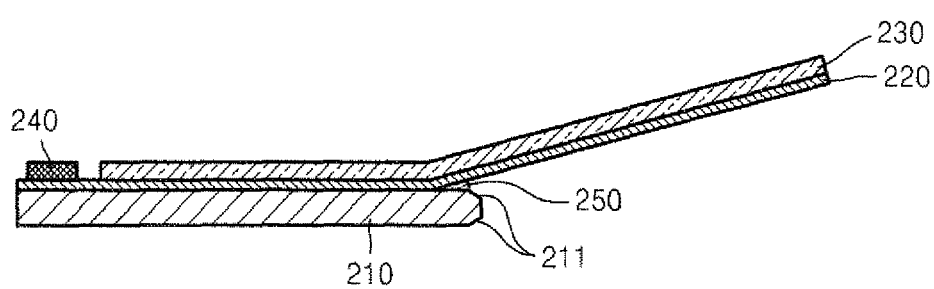

Lastly, as shown in FIG. 5D, a corner 211 on a cutting plane side is obtained by chamfering, the silicone stiffener 250 is applied to the border line where the cutting plane is located, and the flexible substrate 220 is attached so as not to be separated unexpectedly. Later, when the driving chip 240 is installed on a region where the glass substrate 210 remains, manufacturing of the flexible display device 200, including flexibility and toughness as described above, is completed.

Therefore, since about one-half of the area where the glass substrate 210 is not located may be folded or rolled, volume may be significantly reduced for convenience in portability of the flexible display device 200. Also, a stable circuit connection may be guaranteed since the driving chip 240 is installed in an area which does not go through a heating process in order to separate the glass substrate 210 and the flexible substrate 220 during the manufacturing process.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A flexible display device, comprising:
   a glass substrate;
   a flexible substrate including a first portion and a second portion; and
   a display unit including a first display portion disposed on the first portion of the flexible substrate and a second display portion permanently attached to the glass substrate via the second portion of the flexible substrate,
   a surface area of the flexible substrate being greater than a surface area of the glass substrate.

2. The flexible display device of claim 1, wherein the first display portion of the display unit, which is not permanently attached to the glass substrate, deforms together with the first portion of the flexible substrate within a range allowed by flexibility of the flexible substrate.

3. The flexible display device of claim 2, wherein a driving chip is installed on a side of the flexible substrate where the glass substrate is located.

4. The flexible display device of claim 3, further comprising a silicone stiffener for attaching the glass substrate and the flexible substrate disposed around a border line between the first and second portions of the flexible substrate.

5. The flexible display device of claim 4, wherein a corner of a cutting plane of the glass substrate on a side of the border line is chamfered.

6. The flexible display device of claim 3, wherein a corner of a cutting plane of the glass substrate on a side of the border line is chamfered.

7. The flexible display device of claim 2, wherein a corner of a cutting plane of the glass substrate on a side of the border line is chamfered.

8. The flexible display device of claim 2, further comprising a silicone stiffener for attaching the glass substrate and the flexible substrate disposed around a border line between the first and second portions of the flexible substrate.

9. The flexible display device of claim 1, wherein a corner of a cutting plane of the glass substrate on a side of the border line is chamfered.

10. The flexible display device of claim 1, further comprising a silicone stiffener for attaching the glass substrate and the flexible substrate disposed around a border line between the first and second portions of the flexible substrate.

11. The flexible display device of claim 1, wherein a driving chip is installed on a side of the flexible substrate where the glass substrate is located.

* * * * *